United States Patent
Li

(10) Patent No.: US 7,720,070 B1
(45) Date of Patent: May 18, 2010

(54) HYBRID ACKNOWLEDGEMENT MAP FORMAT FOR DATA COMMUNICATION NETWORKS

(75) Inventor: Yalun Li, Fremont, CA (US)

(73) Assignee: Apacewave Technologies Corporation, Fremont, CA (US)

( * ) Notice: Subject to any disclaimer, the term of this patent is extended or adjusted under 35 U.S.C. 154(b) by 513 days.

(21) Appl. No.: 11/675,350

(22) Filed: Feb. 15, 2007

(51) Int. Cl.
*H04L 12/28* (2006.01)

(52) U.S. Cl. ........................ 370/392; 370/474
(58) Field of Classification Search ........ None
See application file for complete search history.

(56) References Cited

U.S. PATENT DOCUMENTS

| | | | | |
|---|---|---|---|---|
| 6,801,512 B1* | 10/2004 | Cudak et al. | ........... | 370/332 |
| 2006/0034277 A1* | 2/2006 | Jang et al. | ........... | 370/389 |
| 2007/0124640 A1* | 5/2007 | Suh et al. | ........... | 714/748 |
| 2007/0244074 A1* | 10/2007 | Pramanick et al. | ........... | 514/94 |

* cited by examiner

*Primary Examiner*—Phuc Tran
(74) *Attorney, Agent, or Firm*—Fenwick & West LLP

(57) ABSTRACT

An information element including a hybrid acknowledgement map format and a method for using the hybrid acknowledgement format and information element are disclosed. The hybrid acknowledgement map comprises a type flag and a content block, and the value of the type flag indicates the format of the content block. This enables the hybrid acknowledgement map to represent data using multiple formats. The information element including a hybrid acknowledgement map includes a hybrid acknowledgement map and a hybrid quantity field indicating the number of hybrid acknowledgement maps in the information element. A field or multiple fields in the information element header indicate whether or not the information element includes a hybrid acknowledgement map. Information elements using hybrid acknowledgement maps contain more acknowledgment information which reduces transmission of information elements.

22 Claims, 11 Drawing Sheets

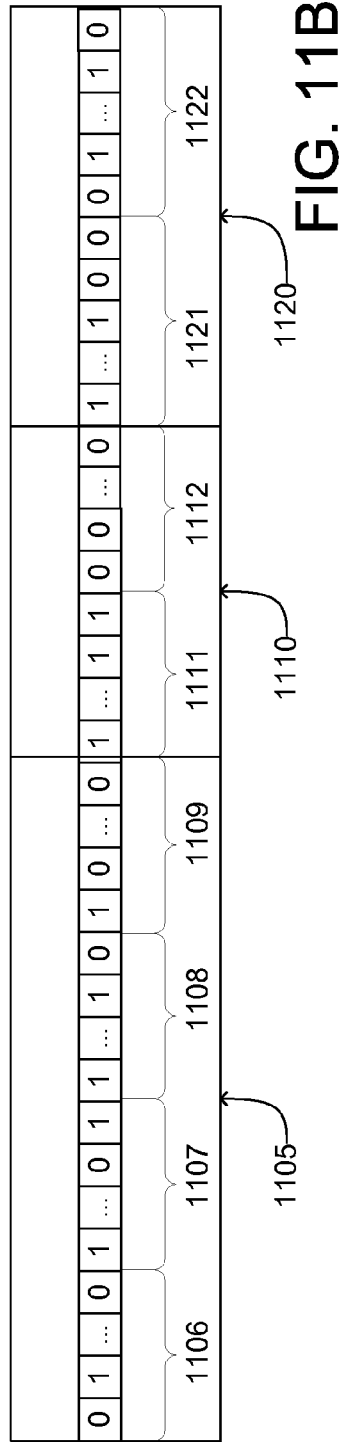
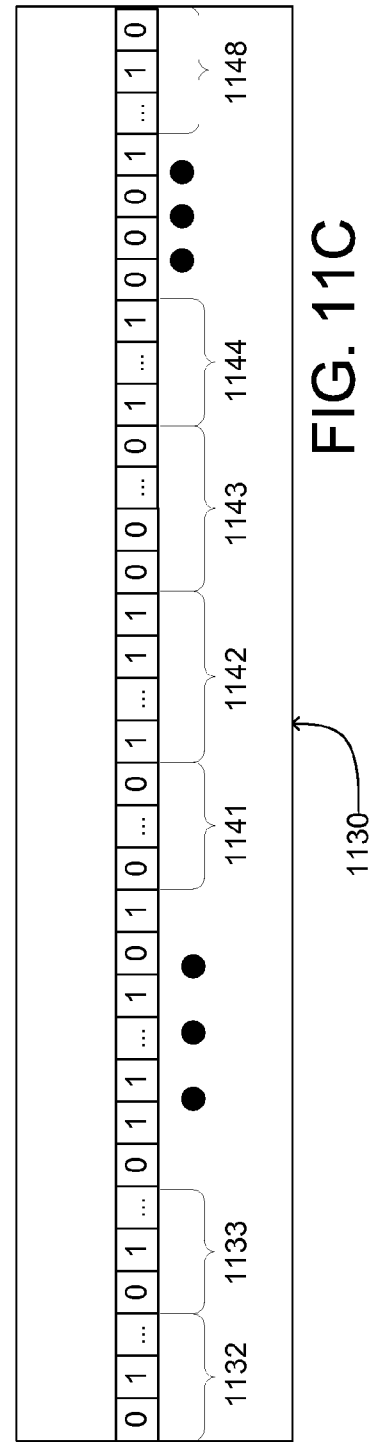

HYBRID ACKNOWLEDGEMENT MAP FORMAT FOR DATA COMMUNICATION NETWORKS

BACKGROUND

1. Field of the Invention

The present invention generally relates to the field of data communication networks, and more specifically, to using an information element including a hybrid acknowledgment map format to indicate receipt of data.

2. Description of the Background Art

Because information transmitted across a data communication network is subject to transmission errors such as data corruption or data loss, error control and/or correction is an integral part of existing data communication networks. Error control and/or correction allows devices using the data communication network to detect, and possibly correct, errors in the transmitted data. Existing data networks use many different methods for error control or error correction.

FIG. 1 is a block diagram representing a typical wireless data communication network 100. A base station 110 and multiple mobile stations 120 communicate data with each other using a communication protocol such as one compliant with the IEEE 802.16 standard. The data communication network 100 uses an Automatic Repeat Request (ARQ) scheme to detect correctly received data and retransmit data erroneously received or lost during transmission. ARQ schemes are commonly used because retransmission of data encountering transmission errors increases the reliability of communication between the mobile stations 120 and the base station 110. In an ARQ scheme, the receiving device automatically requests that the transmitting device retransmit received messages containing errors. Receiving a retransmission request causes the transmitting device to retransmit the requested message. When the message is correctly received, the receiving device transmits an acknowledgement (ACK) message. The requested message can be retransmitted until it is correctly received or the error persists beyond a specified number of retransmissions or persists beyond a specified time interval.

Conventional ARQ schemes use acknowledgment maps (ACK maps) to indicate correct or incorrect receipt of data sequences. By examining the ACK map, the transmitting device identifies the correctly received and incorrectly received segments of the transmitted data. ACK maps have different formats depending on the distribution of errors in the transmitted data. Currently, ACK maps are formatted as a bitmap or a block sequence listing.

When a bitmap is used, the ACK map contains information indicating correct or incorrect receipt of individual data segments. Thus, the bitmap format allows the ACK map to identify specific parts of the data incorrectly received and in need of retransmission. This allows for retransmission of the incorrectly received data segments rather than retransmission of all data.

When a block sequence listing is used, the ACK map contains information indicating whether or not a continuous block of data has been correctly or incorrectly received. However, the block sequence listing cannot indicate specific segments of the data which were correctly or incorrectly received. Thus, when the received data alternates between correct receipt and incorrect receipt, the block sequence listing cannot be used.

In existing ARQ schemes, information elements (IEs) are used to transmit multiple ACK maps. FIG. 2 shows an example of the fields within a typical information element (IE) 200. The IE 200 can be any formatted block of information, such as an ARQ feedback element compliant with the IEEE 802.16 standard.

The IE 200 includes a header 210 and a payload 220. The header 210 includes fields 212, 214 that specify characteristics of the payload 220 or the processing of the payload 220. In conventional ARQ schemes, the header includes a type field 212 and a quantity field 214. The type field 212 identifies the type of the ACK maps contained in the payload 220, and commonly comprises two bits. The quantity field 214 indicates how many ACK maps are contained in the payload 220. The payload 220 contains one to four ACK maps.

Because the type field 212 indicates the format of ACK maps in the payload 220, all ACK maps in an IE 200 must have the same format. Thus, when both bitmap formatted and sequence listing formatted ACK maps are necessary to describe data, multiple IEs 200 must be transmitted, with each IE 200 containing a different ACK map format. So, one IE 200 is necessary to transmit bitmap formatted ACK maps to identify data with correctly received and incorrectly received segments, and a second IE 200 is necessary to transmit sequence listing formatted ACK maps to identify continuous blocks of correctly received or incorrectly received data.

Because each IE 200 contains a header 210, as well as the ACK maps in the payload 220, transmitting additional IEs 200 increases the overhead necessary for ARQ schemes, reducing the bandwidth available for data transmission. As ACK maps are frequently transmitted, the overhead resulting from IE 200 transmission can significantly impair network performance.

Further, conventional IEs 200 and ACK maps have a limited size, which limits the amount of ACK maps that can be included in an IE 200. Typical ARQ schemes permit a maximum of four ACK maps to be included in an IE 200. Thus, incorrect determination of the ACK map format can further increase network usage by increasing the number of IEs 200 transmitted. Additionally, the limited ACK map size can require transmission of additional ACK maps and IEs 200 when the data contains multiple data segment sizes with different types of error distributions.

Therefore, there is a need for an acknowledgement map format capable of representing acknowledgment data in different formats that allows a single information element to include differently formatted acknowledgment maps.

SUMMARY

The present invention overcomes the deficiencies and limitations of the prior art by providing an information element including a hybrid acknowledgement format and a method for using the information element having the hybrid acknowledgment format. An apparatus transmits an information element including a hybrid quantity field and at least one hybrid acknowledgement map. In an embodiment, the apparatus comprises a transceiver for receiving a data and transmitting the information element. An error control module is adapted to communicate with the transceiver and to determine whether the received data contains errors. An encoder module is adapted to communicate with the error control module and to generate the hybrid acknowledgment map and the hybrid quantity field for transmission using the transceiver.

In an embodiment, the information element including the hybrid acknowledgement map and the hybrid quantity field is generated by creating a hybrid acknowledgment map header for the information element. The frequency of errors in the received data is then determined and used to determine a content format for the hybrid acknowledgement map. A type flag of the hybrid acknowledgement map is then initialized to identify the content format of the hybrid acknowledgement map. Content identifying the errors in the received data is then stored to a content block of the hybrid acknowledgement map. The hybrid quantity field is then incremented to indicate the number of hybrid acknowledgement maps included in the information element.

In an embodiment, an apparatus processes an information element including a hybrid acknowledgement map and a hybrid quantity field. The apparatus comprises a transceiver for receiving an information element including a hybrid acknowledgement map comprising a content block and a type flag and a hybrid quantity field. A decoder module is adapted to communicate with the transceiver and uses the hybrid quantity field to determine the number of hybrid acknowledgement maps in the information element, uses the type flag to determine the format of the content block and uses the content block to determine the data to transmit. A data store is adapted to communicate with the decoder module and access the data to transmit identified by the decoder module.

In an embodiment, an information element having a hybrid quantity field and a hybrid acknowledgement map is processed by receiving the information element and extracting the hybrid acknowledgement map. The hybrid acknowledgement map is then decoded and data indicated as incorrectly received by the hybrid acknowledgement map is transmitted.

In an embodiment, the hybrid acknowledgement map is decoded by selecting a hybrid acknowledgment map. A type of the selected hybrid acknowledgement map is then determined. Content of the hybrid acknowledgment map is then examined based on the determined type. Data identified as incorrectly received is then retransmitted.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The invention is illustrated by way of example, and not by way of limitation in the figures of the accompanying drawings in which like reference numerals are used to refer to similar elements.

FIG. 11A is a diagram of an example of acknowledgement data.

FIG. 11B is a diagram of an example application of using conventional information elements and acknowledgment map formats to transmit acknowledgment data.

FIG. 11C is a diagram of an example application of using information elements including hybrid acknowledgment maps to transmit acknowledgement data according to one embodiment of the invention.

DETAILED DESCRIPTION

Information elements containing a hybrid acknowledgement map format and a method for using the hybrid acknowledgment map format and information elements are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below. In addition, the present invention is not described with reference to any particular programming language. It will be appreciated that a variety of programming languages may be used to implement the teachings of the invention as described herein.

Architectural Overview

Figure 1:
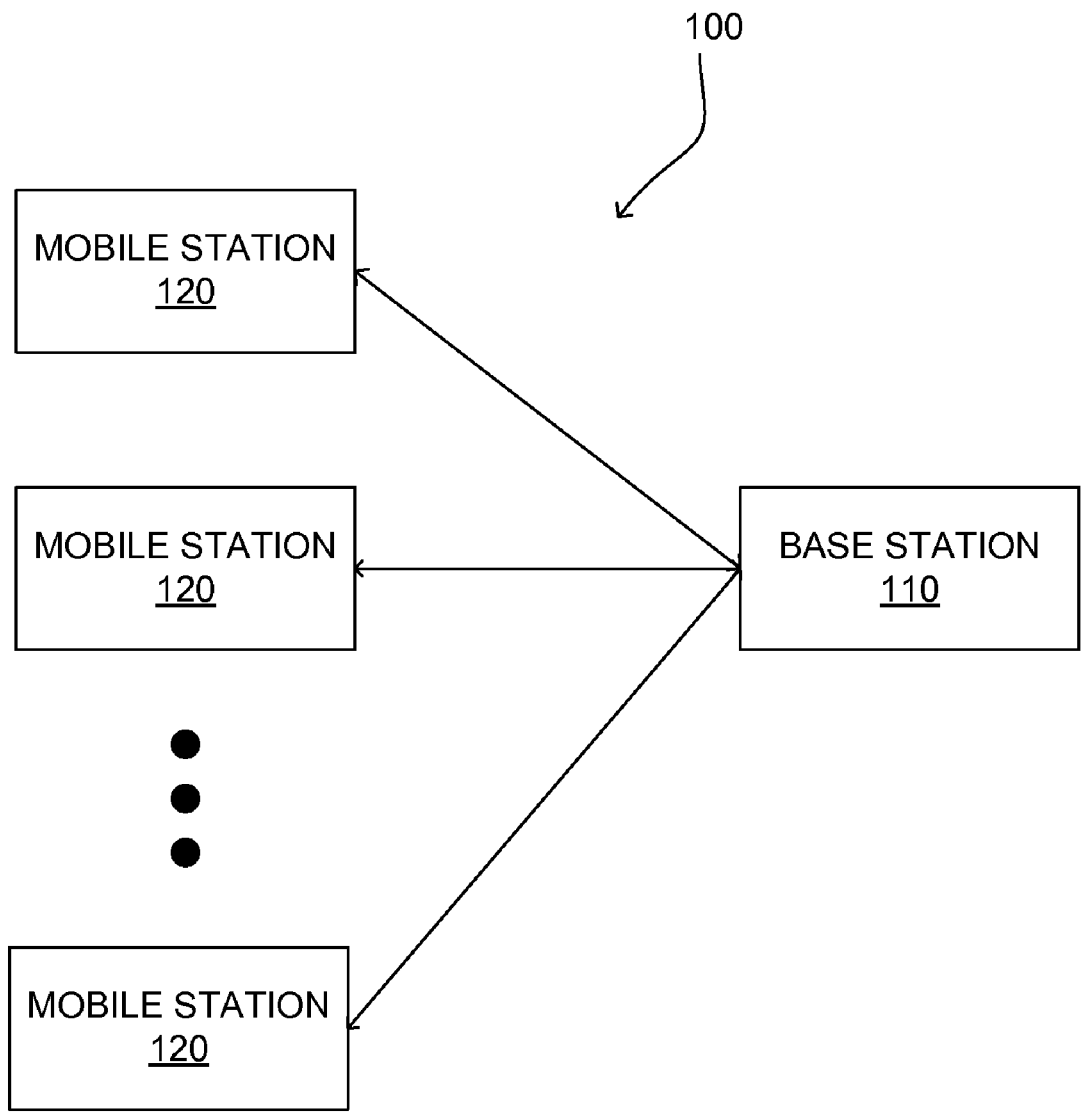
FIG. 1 is a block diagram of a typical data network of the prior art.
Figure 2:
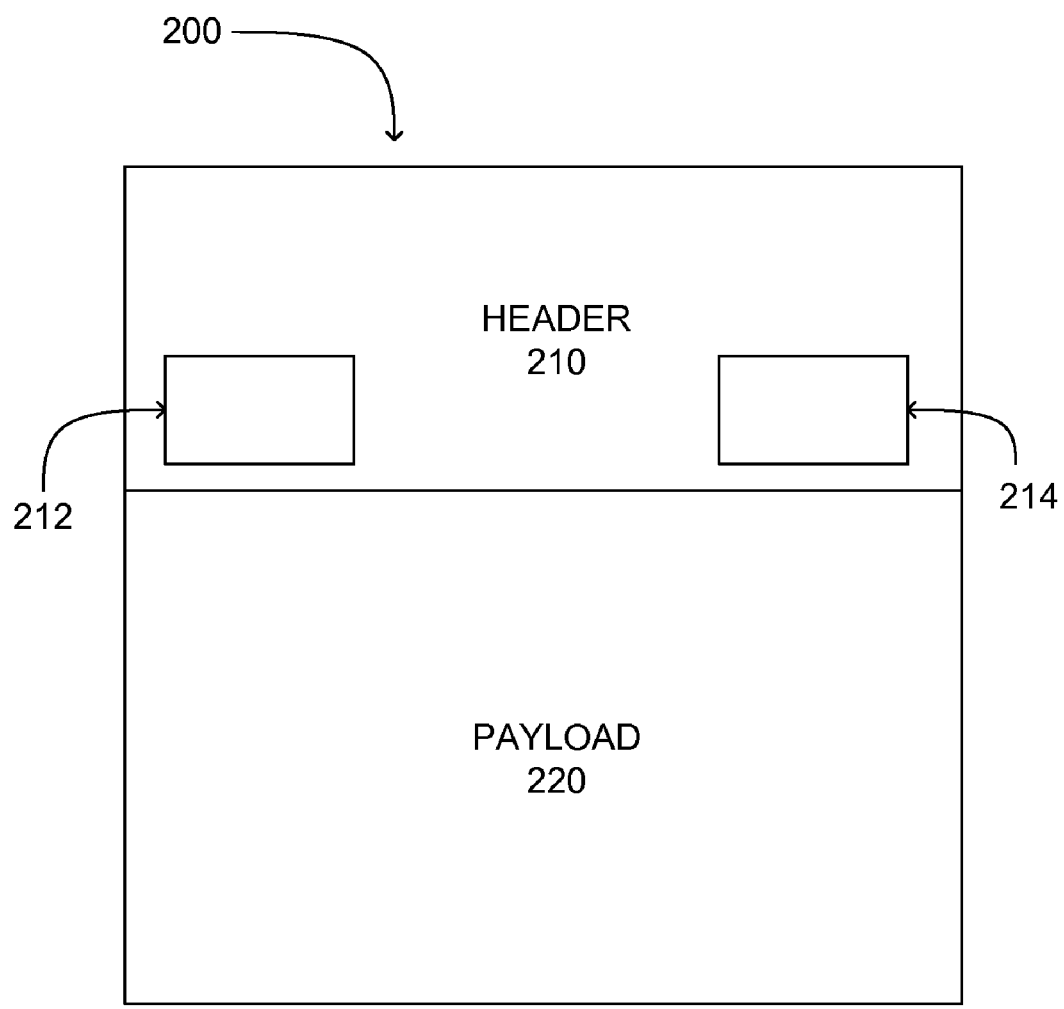
FIG. 2 is an example of the fields within a conventional information element of the prior art.
Figure 3:
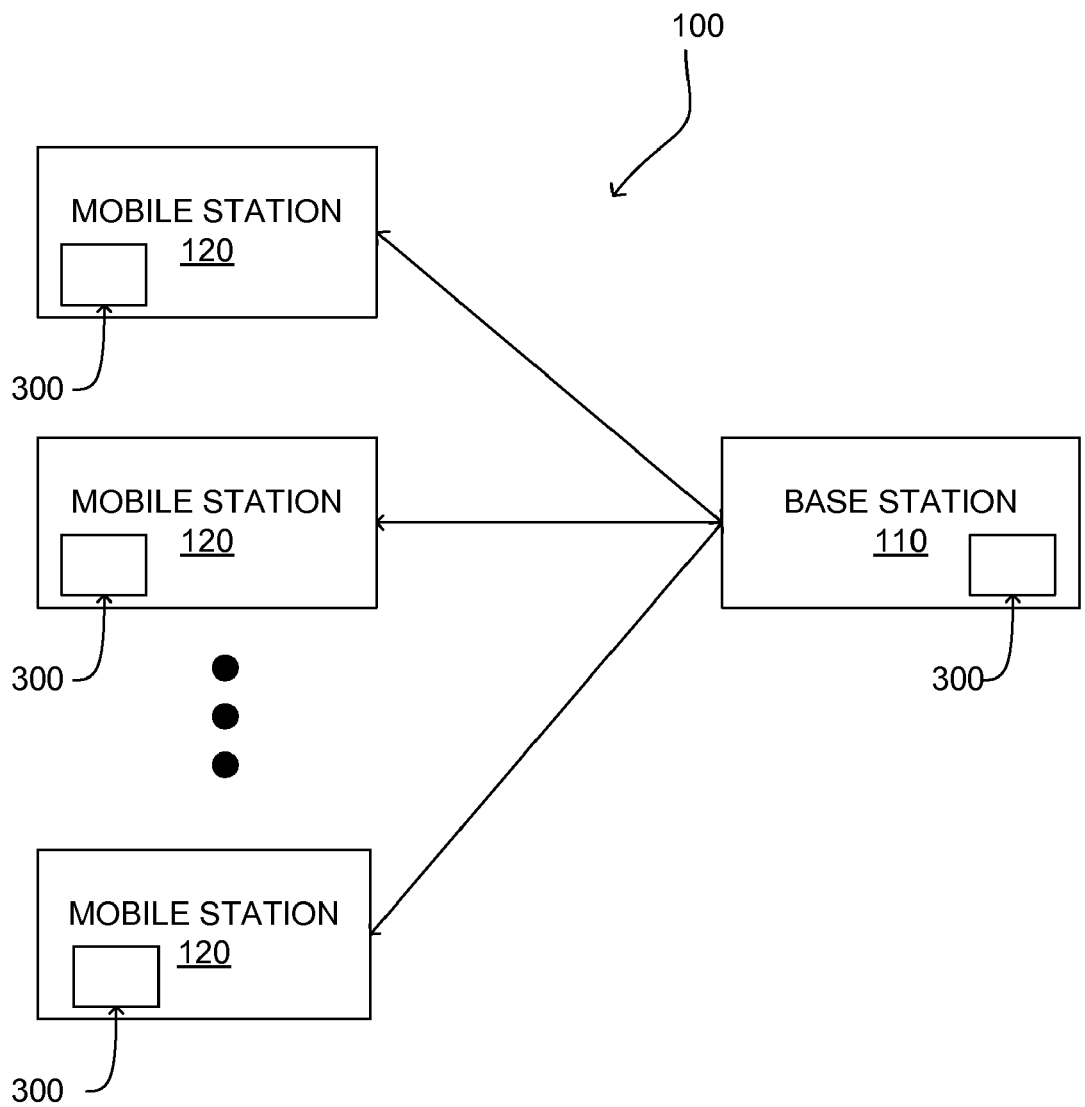
FIG. 3 is a block diagram of a data network according to one embodiment of the invention.

Referring now to FIG. 3, a block diagram of a data network 100 according to one embodiment of the invention is shown. More specifically, FIG. 3 shows a base station 110 and a plurality of mobile stations 120 each including a hybrid processing module 300. In an embodiment, the mobile stations 120 and the base station 110 use an automatic request (ARQ) scheme using hybrid acknowledgment maps (ACK maps) when communicating with each other. While the present invention is described below with each device 110, 120 including a hybrid processing module 300, those skilled in the art will recognize that the present invention is backward compatible such that encoder and decoders as described above are able to process IEs using the same format as shown in FIG. 4 or existing formats.

The hybrid processing module 300 encodes or decodes hybrid ACK maps. The hybrid processing module 300 can be implemented many ways. For example, it may be structured as a software process and/or a firmware application. The software and/or firmware can be structured to operate on a general purpose microprocessor or controller, a field programmable gate array (FPGA) or an application specific integrated circuit (ASIC) or a combination thereof. Modulation imbalance distortion then offsets the pre-distortion, resulting in an undistorted modulated signal. In one embodiment, the modulator 240 includes the compensation module 230. In an alternative embodiment, a processor includes the compensation module 230 and compensation parameter generator 225. In another embodiment, the compensation module 230 is a discrete module that modifies the data signal before modulation. In an embodiment, the hybrid processing module 300 is capable of encoding and decoding hybrid ACK maps. Alternatively, a hybrid processing module 300 encodes hybrid ACK maps and a separate hybrid processing module 300 decodes hybrid ACK maps.

Figure 4:
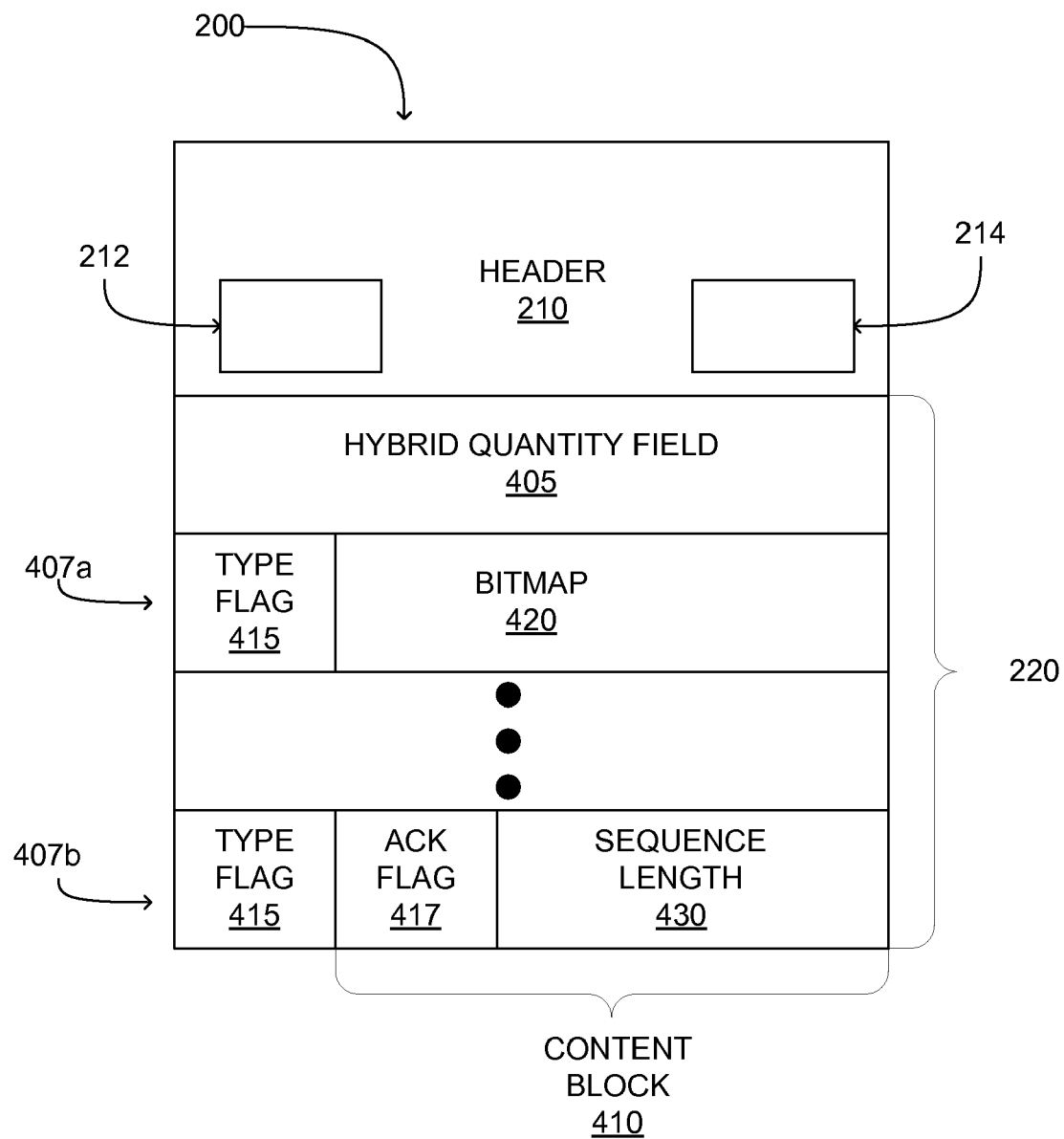
FIG. 4 is an example of a structure for an information element used to transmit hybrid acknowledgement maps according to one embodiment of the invention.

FIG. 4 shows an example of a structure for an information element (IE) 200 used to transmit hybrid ACK maps 407 according to one embodiment of the present invention. The example of FIG. 4 shows an IE 200 with a payload 220 comprising a plurality of hybrid ACK maps 407 and a hybrid quantity field 405. In an embodiment, the information element 200 is capable of including conventional ACK maps, rather than hybrid ACK maps 407, in the payload 220. Appendix I provides an example of an information element 200 structure capable of containing hybrid ACK maps 407 or a subset of the conventional ACK map formats. For example, existing WiMAX systems do not require implementation of all ACK map types defined in the IEEE 802.16 standard, so a conventional WiMAX system can substitute the hybrid ACK map 407 type for one of the non-required IEEE 802.16 ACK map types. Provided the base station 110 and mobile station 120 identify the hybrid ACK map 407, existing WiMAX systems can be readily modified to use hybrid ACK maps 407 as well as conventional ACK maps.

Appendix II provides an example of an information element 200 structure capable of containing any conventional ACK map formats or hybrid ACK maps 407. Thus, the example of Appendix II illustrates an information element structure 200 allowing existing data communication networks 100 to use either conventional ACK map formats or to use hybrid ACK maps 407. While the information element 200 include a plurality of hybrid ACK maps 407, in different embodiments the IE 200 may include from 1 to 256 hybrid ACK maps 407. For example, existing WiMAX systems can implement the ACK map types defined in the IEEE 802.16 standard, and use a combination of ACK map type field 212 and another value in ACK quantity field 214 to indicate the use of hybrid ACK maps 407. This provides an alternative method for modifying existing WiMAX systems to use hybrid ACK maps 407.

The IE 200 includes a header 210 and a payload 220. The header 210 includes fields that specify characteristics of the payload 220 or the processing of the payload 220. In an embodiment, header 210 includes a type field 212 and a quantity field 214. The type field 212 specifies the format of the ACK maps contained in the payload 220 contents. According to one embodiment, the type field 212 comprises two bits, and the combination of bits describes the ACK map format. For example, the type field 212 can specify whether hybrid ACK maps 407, sequence listing formatted ACK maps or bitmap formatted ACK maps are stored in payload 220. Appendix I provides an example IE 200 structure that uses the type field 212 to indicate hybrid ACK maps 407 are stored in the payload 220.

As used by the prior art, the quantity field 214 indicates how many conventional ACK maps are contained in the payload 220. With such prior art use, the quantity field 214 comprises a fixed length indicating the number of ACK maps contained in the payload 220. For example, the quantity field 214 can comprise two bits indicating whether 1, 2, 3 or 4 conventional ACK maps are contained in the payload. However, the present invention uses a combination of values in the type field 212 and in the quantity field 214 indicates whether the payload 220 contains hybrid ACK maps 407. Using type field 212 and quantity field 214 to identify hybrid ACK maps 407 allows the type field 212 to identify all existing formats of ACK maps while also allowing the information element 200 to alternatively include hybrid ACK maps 407, making the IE 200 backward compatible with existing communication methods. Appendix II provides an example IE structure that uses a combination of the type field 212 and the quantity field 214 to indicate hybrid ACK maps 407 are stored in the payload 220.

When the IE 200 includes hybrid ACK maps 407, the payload 220 includes a hybrid quantity field 405. The hybrid quantity field 405 indicates the number of hybrid ACK maps 407 included in the payload 405. Inclusion of the hybrid quantity field 405 in the payload 220 allows IEs 200 to contain more hybrid ACK maps 407 than can be specified by the fixed length of the quantity field 214. This increases the amount of hybrid ACK maps that can be transmitted using a single IE 200, reducing the number of IEs 200 transmitted and conserving network resources.

In the prior art, the IE 200 has a fixed size which limits the amount of data that can be stored in the payload 220. However, with the present invention using hybrid ACK maps 407 allows more data to be included in fixed size of each IE 200. When the quantity field 214 is used to specify the number of ACK maps in an IE 200, the number of ACK maps in the payload 220 is limited to the number that can be represented by the quantity field 214. Because the hybrid quantity field 405 is in the payload 220, it is updated in response to the number of hybrid ACK maps 407 in the payload 220. Thus, the number of hybrid ACK maps 407 in the payload 220 is limited by the payload 220 size, rather than the size of the quantity field 214.

The hybrid ACK map 407 comprises a type flag 415 and a content block 410. The content block 410 is capable of representing a plurality of ACK map formats. In one embodiment, the content block 410 can be formatted as a bitmap-type hybrid ACK map 407*a* or as a sequence listing-type hybrid ACK map 407*b*. Depending on the frequency of errors in the data, the content block 410 format is modified to optimally transmit information about the data.

For example, when the received data contains alternating correctly received segments and incorrectly received segments, the content block 410 is formatted as a bitmap-type hybrid ACK map 407*a* including a bitmap 420 which identifies the correctly received segments and the incorrectly received segments. Alternatively, when the received data contains a continuous block of correctly or incorrectly received data, the content block 410 is formatted as a sequence listing-type hybrid ACK map 407*b*. When the sequence listing-type hybrid ACK map 407*b* is used, the content block 410 comprises an ACK flag 417 and a sequence length 430. The sequence length 430 indicates the number of continuous data blocks described by the hybrid ACK map 407. The ACK flag 417 indicates whether the number of data blocks denoted by the sequence length 430 were correctly received or incorrectly, or not, received . . . .

The type flag 415 indicates the format of the content block 410, so examination of the type flag 415 determines how the data in the content block 410 is analyzed. In one embodiment, the type flag 415 comprises a sequence of bits where each bit sequence corresponds to a different content block 410 format. For example, one setting of the type flag 415 indicates the content block 410 is a bitmap 420 identifying correctly received and incorrectly received data segments. Another setting of the type flag 415 indicates the content block is an ACK flag 417 and sequence length 430 identifying correct or incorrect receipt of continuous data blocks. In an embodiment, the type flag 415 is a single bit, and the value of the bit determines whether the content block 410 is a bitmap 420 or ACK flag 417 and sequence length 430. The above descriptions are merely examples, and the type flag 415 may identify any format capable of indicating the content block 410 format.

Figure 5:
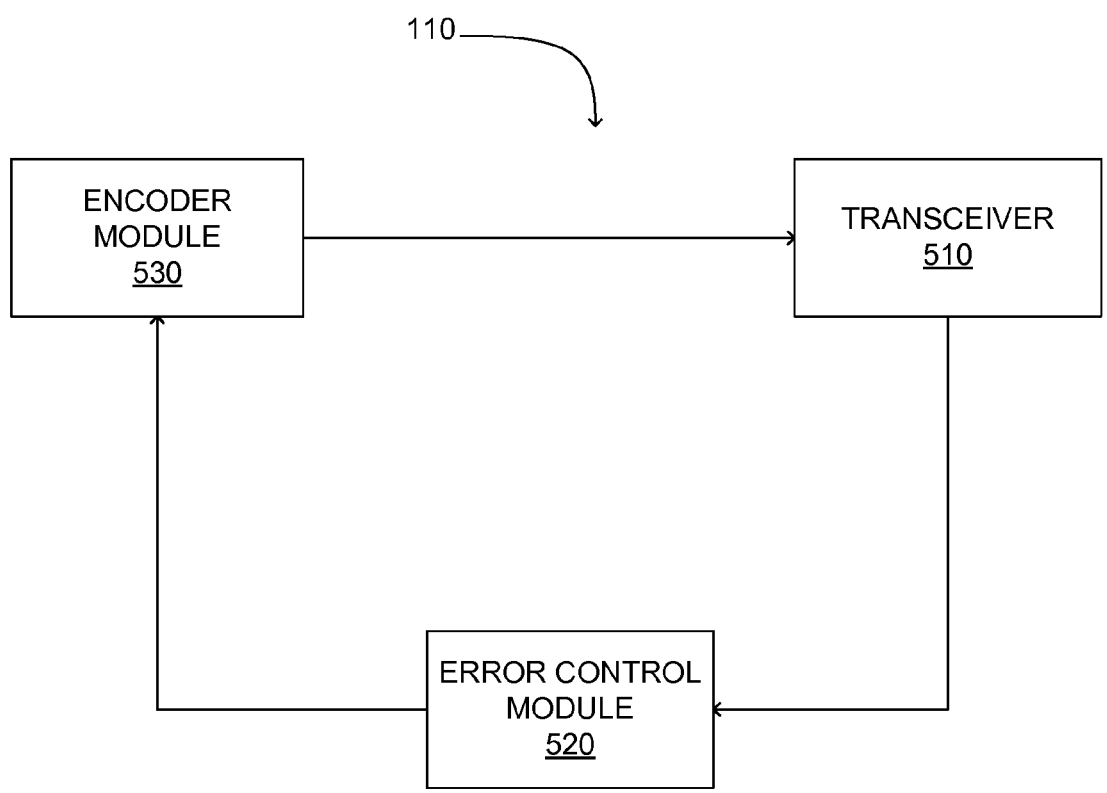
FIG. 5 is a block diagram of a device that generates information elements containing hybrid acknowledgement maps, according to one embodiment of the invention.

FIG. 5 is a block diagram of a device, such as base station 110, that generates information elements 200 containing hybrid ACK maps 407, according to one embodiment of the invention. In another embodiment, the mobile station 120 generates information elements 200 containing hybrid ACK maps 407. Those of skill in the art will recognize that different embodiments can provide the functionality of FIG. 5 in different ways. Moreover, other embodiments can include different and/or additional features and/or components than the ones described here.

In one embodiment, the base station 110 comprises a transceiver 510, an error control module 520 and an encoder module 530. The transceiver 510 receives data from another device and transmits information elements 200 containing hybrid ACK maps 407. In one embodiment, the transceiver 510 comprises an antenna capable of transmitting and receiving wireless signals, but can be any device capable of transmitting and receiving signals.

The error control module 520 examines the data received by transceiver 510 for errors occurring during transmission. The error control module 520 applies an error detection algorithm to the received data to check for errors. Different error detection algorithms can be used, such as cyclic redundancy check (CRC), computing parity, parallel parity, check sum, or any other algorithm capable of determining whether the received data contains errors. Additionally, the error control module 520 determines whether segments of the data were lost during transmission, and indicates which segments of the data were lost. For example, the error control module 520 examines sequence numbers of the received data segments and identifies whether the sequence numbers are consecutive. If the sequence numbers are non-consecutive, the error control module 520 determines that the data segments corresponding to the missing sequence numbers were not received.

The error control module 520 can be implemented many ways. For example, it may be structured as a software process and/or a firmware application. The software and/or firmware can be structured to operate on a general purpose microprocessor or controller, a field programmable gate array (FPGA) or an application specific integrated circuit (ASIC) or a combination thereof. Alternatively, the error control module 520 may comprise a processor configured to process data signals and may comprise various computing architectures including a complex instruction set computer (CISC) architecture, a reduced instruction set computer (RISC) architecture, or an architecture implementing a combination of instruction sets. The error control module 520 can comprise a single processor or multiple processors. In an embodiment, the error control module 520 comprises an arithmetic logic unit, a microprocessor, or some other information appliance equipped to process received electronic signals and provide electronic signals. In an alternative embodiment, the transceiver 510 includes the error control module 520.

The encoder module 530 receives input from the error control module 520 and accordingly generates an information element 200 containing a hybrid ACK map 407. In one embodiment, the encoder module 530 determines the format of the hybrid ACK map's 407 content block 410 depending on the location of errors in the received data. In one embodiment, the encoder module 530 changes the content block 410 format based on the frequency of errors in the received data. For example, when large segments of the data are received error-free, the encoder module 530 uses a sequence listing format. When the received data alternates between correctly and incorrectly received, the encoder module 530 uses a bitmap format. In an embodiment, the encoder module 530 uses the method described below in FIG. 8 to generate the information element 200 containing the hybrid ACK map 407.

The encoder module 530 can be implemented many ways. For example, it may be structured as a software process and/or a firmware application. The software and/or firmware can be structured to operate on a general purpose microprocessor or controller, a field programmable gate array (FPGA) or an application specific integrated circuit (ASIC) or a combination thereof. In one embodiment, the transceiver 510 includes the encoder module 530. In an alternative embodiment, a processor includes the encoder module 530 and the error control module 520. In another embodiment, the encoder module 530 is a discrete module that modifies the data signal before modulation.

Figure 6:
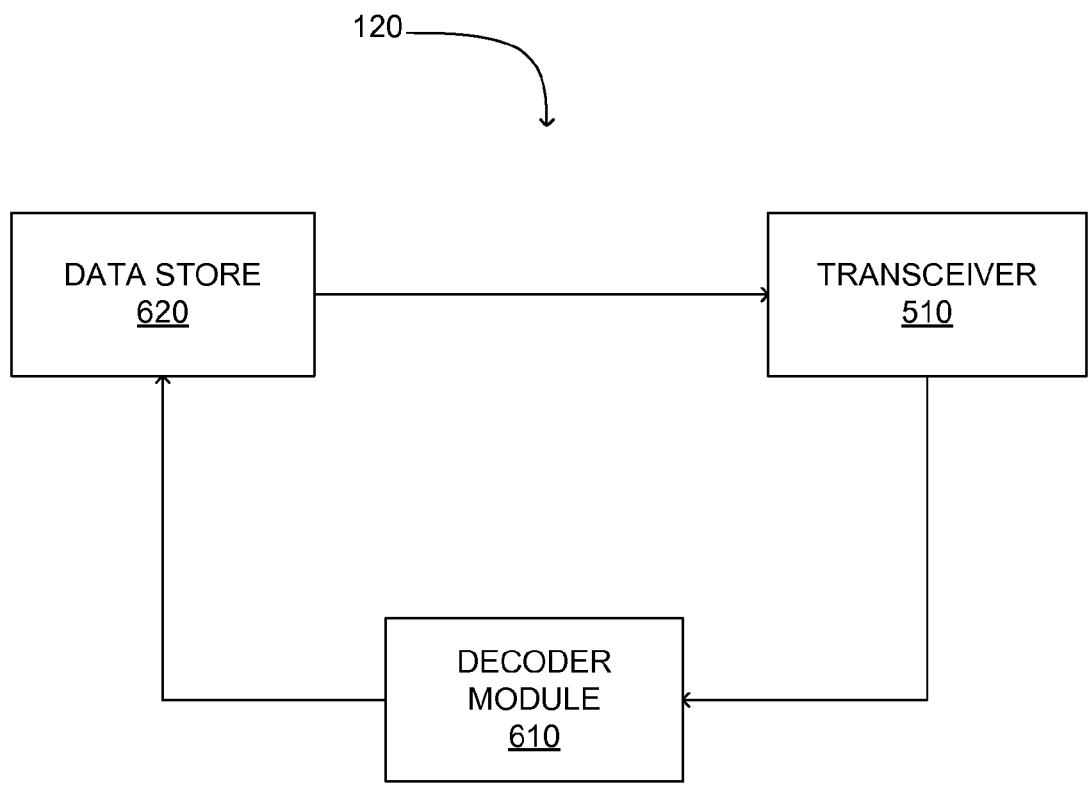
FIG. 6 is a block diagram of a device that processes information elements containing hybrid acknowledgement maps according to one embodiment of the invention.

FIG. 6 is a block diagram of a device, such as the mobile station 120, which processes information elements 200 containing hybrid acknowledgement maps 407 according to one embodiment of the invention. In another embodiment, the base station 110 processes information elements 200 containing hybrid ACK maps 407. Those of skill in the art will recognize that different embodiments can provide the functionality of FIG. 6 in different ways. Moreover, other embodiments can include different and/or additional features and/or components than the ones described here.

Similar to the base station 110, the mobile station 120 comprises a transceiver 510. The transceiver 510 transmits data and receives information elements 200 containing hybrid ACK maps 407. The mobile station 120 also comprises a decoder module 610 and a data store 620. The decoder module 610 identifies data from the data store 620 to be retransmitted using the transceiver 510.

The decoder module 610 uses the received information elements 200 and the included hybrid ACK maps 407 to determine which data has been successfully received by another device and which data needs to be retransmitted. Additionally, if the received information element 200 indicates data needs to be retransmitted, the decoder module 610 uses the hybrid ACK map 407 included in the information element 200 to identify the data to retransmit. In an embodiment, the decoder module 610 uses the method described below in FIG. 10 to decode the information element 200 containing the hybrid ACK map 407.

The decoder module 610 can be implemented many ways. For example, it may be structured as a software process and/or a firmware application. The software and/or firmware can be structured to operate on a general purpose microprocessor or controller, a field programmable gate array (FPGA) or an application specific integrated circuit (ASIC) or a combination thereof. The decoder module 610 extracts the hybrid ACK maps 407 from the information element 200 and uses the hybrid ACK maps 407 identify transmitted data and whether or not the transmitted data was accurately received.

In one embodiment, the transceiver 510 includes the decoder module 610. In an alternative embodiment, a processor includes the decoder module 610. In another embodiment, the decoder module 610 is a discrete module that modifies the data signal before modulation.

The data storage device 620 includes the data that is initially transmitted, and retransmitted, if necessary, to another device. The data storage device 620 may be a hard disk drive, a flash memory device, or some other mass storage device known in the art. In one embodiment, the data storage device 620 can be a portable media device, such as an SD card, CompactFlash card or MD card. In an alternate embodiment, the data storage device 620 can be replaced by a connection to an external data storage unit.

System Operation

Figure 7:
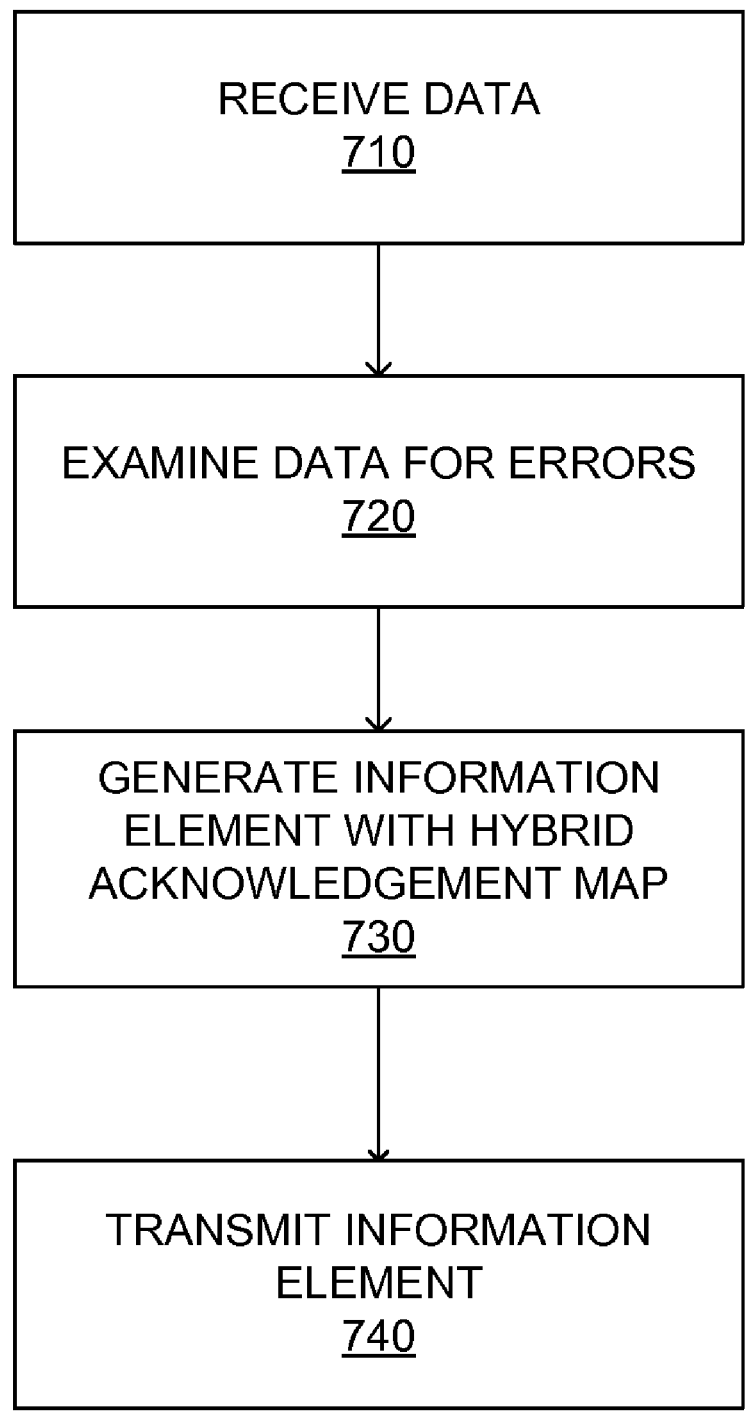
FIG. 7 is a flow chart of a method for transmitting information elements containing hybrid acknowledgement maps according to one embodiment of the invention.

FIG. 7 is a flow chart of a method for transmitting information elements 200 containing hybrid acknowledgement maps 407 according to one embodiment of the invention. The diagram of FIG. 7 illustrates an example of transmission of an information element 200 including a hybrid ACK map 407 by the base station 110, according to an embodiment of the invention. In an embodiment, the mobile station 120 transmits the information element 200.

Initially, data is received 710 and examined 720 for errors. The error examination 720 uses the contents of the received data. Different error detection algorithms, such as cyclic redundancy check (CRC), computing parity, parallel parity, check sum, or any other algorithm capable of determining whether the received data contains errors, can be used to examine 720 the data for errors. Additionally, the error examination 720 detects whether segments of the received data have been lost during transmission. For example, each data segment includes a sequence number which is increased by a fixed amount for each new data segment. During error examination 720, the sequence number of each data segment is reviewed, and any missing sequence number indicates that data associated with the missing sequence number was not received (e.g. lost during the transmission). The error examination 720 treats data incorrectly received and data not received, and indicates that data encountering either type of problem should be retransmitted.

Figure 8:
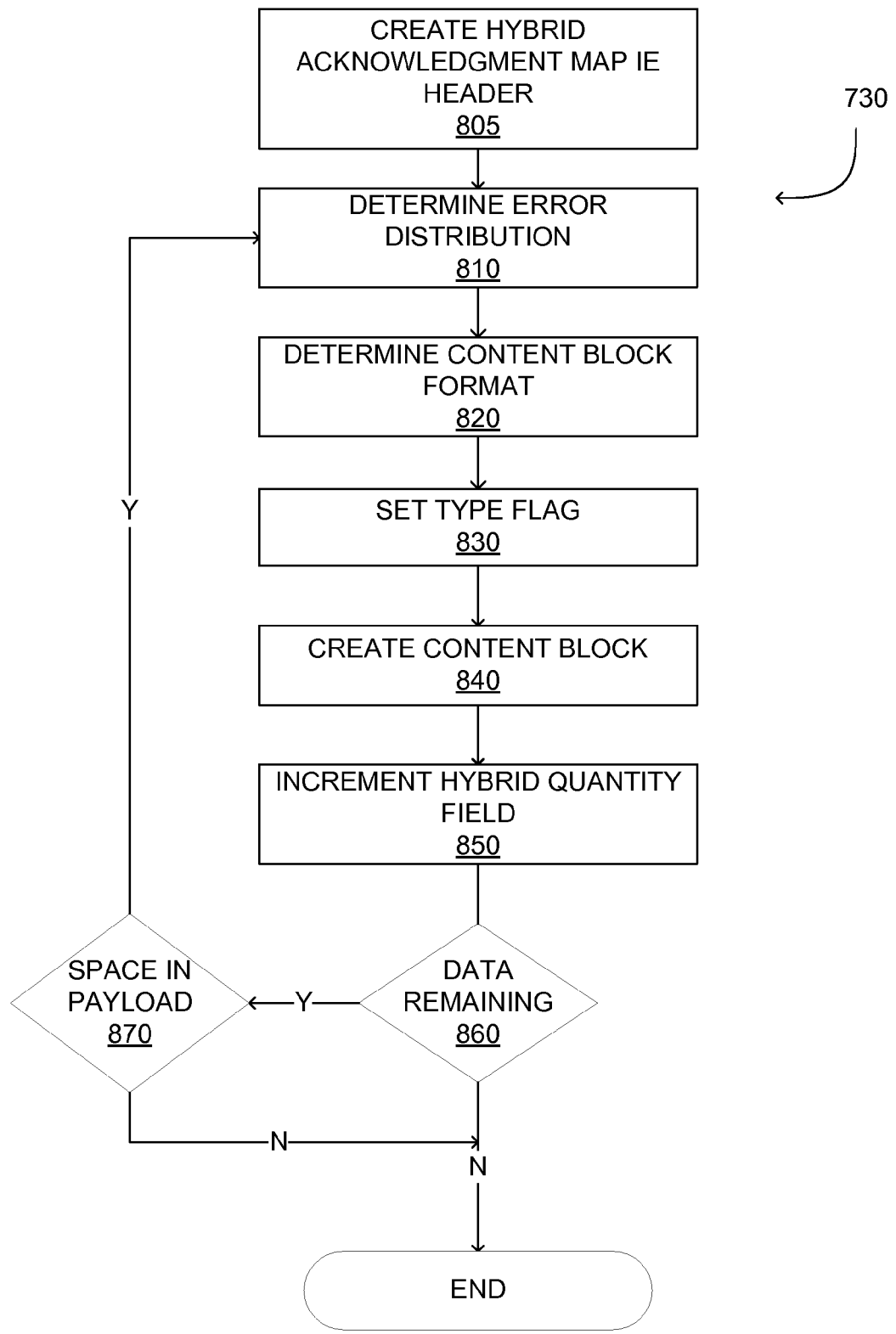
FIG. 8 is a flow chart of a method for generating an information element having hybrid acknowledgement map(s) according to one embodiment of the invention.

An information element 200 including a hybrid ACK map 407 indicating the correctly received data and the incorrectly received data is generated 730 using the results of the examination 720. In an embodiment, the format of the content block 410 of the hybrid ACK map 407 depends on the results of the data examination 720 so each hybrid ACK map 407 describes as much data as possible. The number of hybrid ACK maps 407 included in the information element 200 is also varied to maximize the amount of data contained in each IE 200 to reduce the number of IEs 200 transmitted . . . . In an embodiment, the method described below in FIG. 8 is used to generate 730 the hybrid ACK maps 407. However, the method described below in FIG. 8 is merely an example of a method for generating 730 hybrid ACK maps 407 and other methods may be used. Varying the content block 410 format and number of hybrid ACK maps 407 per information element 200 reduces the number of information elements 200 transmitted, conserving data communication network 100 resources. The information element 200 containing the hybrid ACK map 407 is then transmitted 740.

FIG. 8 is a flow chart of a method for generating 730 information elements 200 containing hybrid acknowledgement maps 407 according to one embodiment of the invention.

Initially, a hybrid ACK map 407 IE header 210 is created 805 which indicates that the information element 200 payload 220 includes a hybrid ACK map 407, or a plurality of hybrid ACK maps 407. In an embodiment, the value of the type field 212 is used to create 805 the hybrid ACK map 407 IE header 210. For example, setting the type field 212 to a particular value identifies 805 the payload 220 as including hybrid ACK maps 407. Appendix I provides an example showing use of the type field 212 to identify 805 the contents of the payload 220 as hybrid ACK maps 417.

Alternatively, a combination of values in the type field 212 and quantity field 214 creates 805 the hybrid ACK map 407 IE header 210. Using the combination of type field 212 and quantity field 214 to identify 805 the hybrid ACK maps 807 allows the information element 200 to transmit hybrid ACK maps 407 while retaining the ability to alternatively transmit conventional types of ACK maps. Appendix II provides an example illustrating use of the type field 212 and quantity field 214 to create 805 a hybrid ACK map 407 IE header 210.

The distribution of errors in the data is then determined 810. The error distribution is used to determine 820 the format of the hybrid ACK map 407 content block 410. Determining 820 content block 410 format based on the error distribution allows the hybrid ACK map 407 to contain the maximum amount of information describing the received data. For example, when the received data alternates between correctly received and incorrectly received or not received, the content block 410 is formatted as a bitmap 420 that identifies the status of individual data segments. Alternatively, when the received data comprises continuous sequences of correctly received or incorrectly received (or lost) data, the content format 410 is formatted as a sequence listing to indicate successful or unsuccessful receipt of the continuous blocks of data.

Once the content block 410 format is determined 820, the type flag 415 is set 830 to identify the content block 410 format. The content block is then created 840 by storing data to the hybrid ACK map 407. After setting 830 the type flag 415 and creating 840 the content block 410, the hybrid quantity field 405 is incremented by a fixed value 850. Because information elements 200 including hybrid ACK maps 407 use the hybrid quantity field 405, rather than the quantity field 214, to indicate the number of hybrid ACK maps 407 in the payload 220, the hybrid quantity field 405 is incremented by a fixed value 850 each time a hybrid ACK map 407 is added to the information element 200.

It is then determined 860 whether data remains to be included in the information element 200. If there is no data remaining, the information element 200 containing the hybrid ACK maps 407 is transmitted 740. If there is data remaining, it is determined 870 whether space remains in the payload 220 of the information element 200. Although use of hybrid ACK maps 407 increases the amount of data included in each information element 200, the information element 200 has a finite storage capacity which places an upper limit on the number of hybrid ACK maps 407 in each IE 200. For example, in one embodiment, each information element 220 may be able to store at most 255 hybrid ACK maps 407. If space remains in the payload 220, the error distribution pattern of the remaining data is determined 810, and the method repeats until there is no data remaining or no space in the payload 220.

Because conventional methods permit only a single ACK map format, either bitmap or sequence listing, to be contained in each information element 200, multiple information elements 200 must be transmitted to accommodate different ACK map formats used for different error distributions. This requires generation of additional information elements 200 whenever the ACK map format changes. Transmission of these additional information elements 200 creates additional overhead from the headers 210 of each information element 200. This overhead is further increased because the number of ACK maps in a conventional information element 200 is limited to the number that can be described using the quantity field 214, causing transmission of additional information elements 200. Because information elements 200 containing ACK maps are frequently transmitted, this additional overhead reduces the bandwidth available for data transmission.

An information element 200 containing hybrid ACK maps 407 enables a single information element 200 to describe data having segments with different error frequencies, reducing the number of information elements 200 transmitted. Further, the number of hybrid ACK maps 407 included in an information element 200 is limited by the maximum payload 220 size rather than the quantity field 214. This increases the number of hybrid ACK maps 407 included in each information element 200, further reducing the number of information elements 200 necessary to transmit data and conserving network resources and bandwidth.

Figure 9:
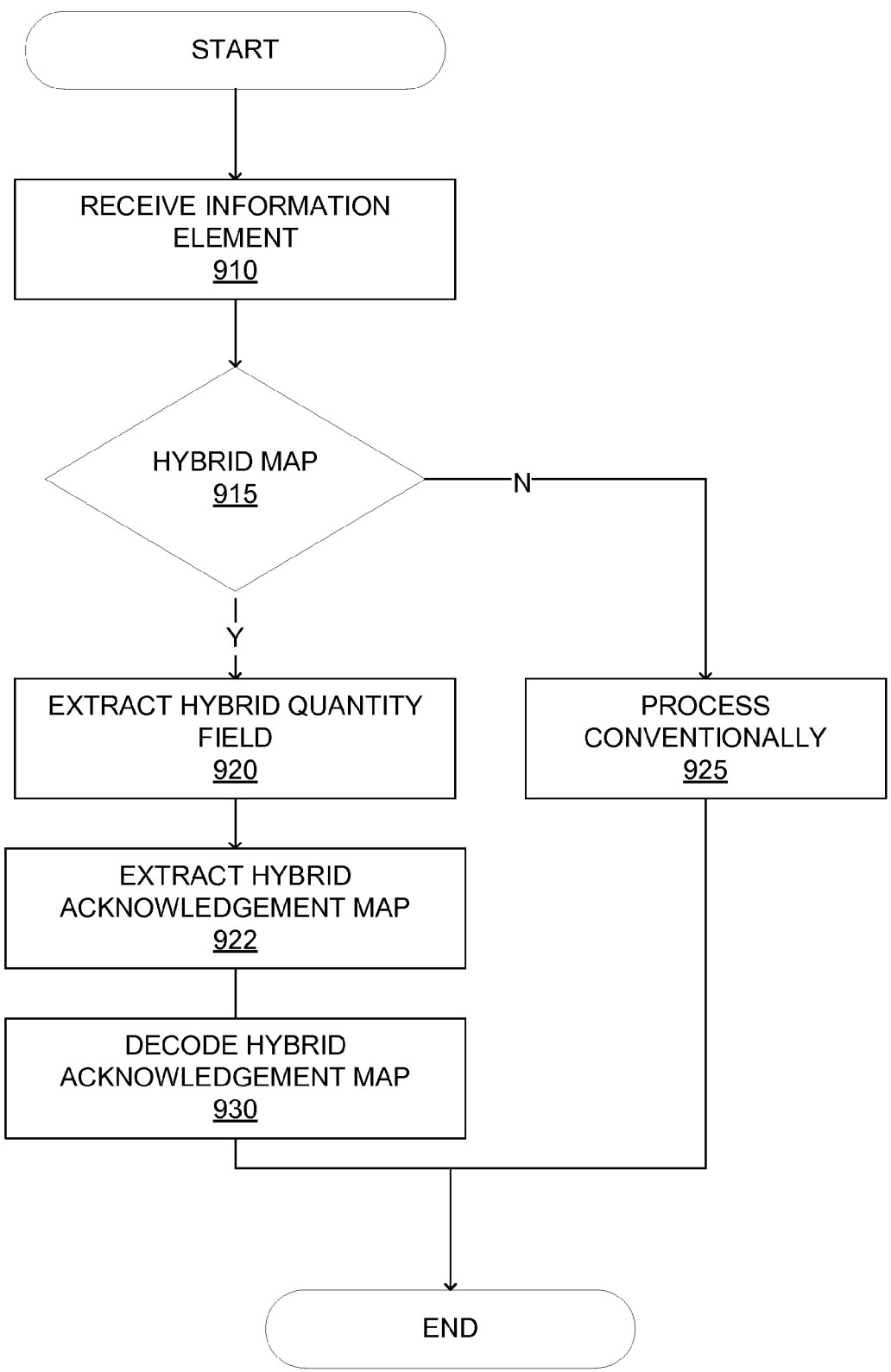
FIG. 9 is a flow chart of a method for processing information elements having hybrid acknowledgment map(s) according to one embodiment of the invention.

FIG. 9 is a flow chart of a method for processing information elements 200 containing hybrid acknowledgement maps 407 according to one embodiment of the invention. The diagram of FIG. 9 illustrates an example of processing of a hybrid acknowledgment map 407 by the mobile station 120 according to an embodiment of the invention. In an embodiment, the base station 110 processes the information elements 200.

After the information elements 200 are received 910, it is then determined 915 whether the information elements 200 include hybrid ACK maps 407. In an embodiment, this determination 915 examines fields in the information element 200 header 210 to determine whether hybrid ACK maps 407 are included. If the information element 200 does not include hybrid ACK maps 407, the information element 200 is processed 925 using conventional techniques, such as those described in the IEEE 802.16 standard.

If the information element 200 includes hybrid ACK maps 407, the hybrid quantity field 405 is extracted 920 from the information element 200 by examining the contents of the payload 220 of the information element 200. In an embodiment, the hybrid quantity field 405 comprises the first field of the payload 220. In another embodiment, the hybrid quantity field 405 is stored at a fixed memory address within the payload 220.

Figure 10:
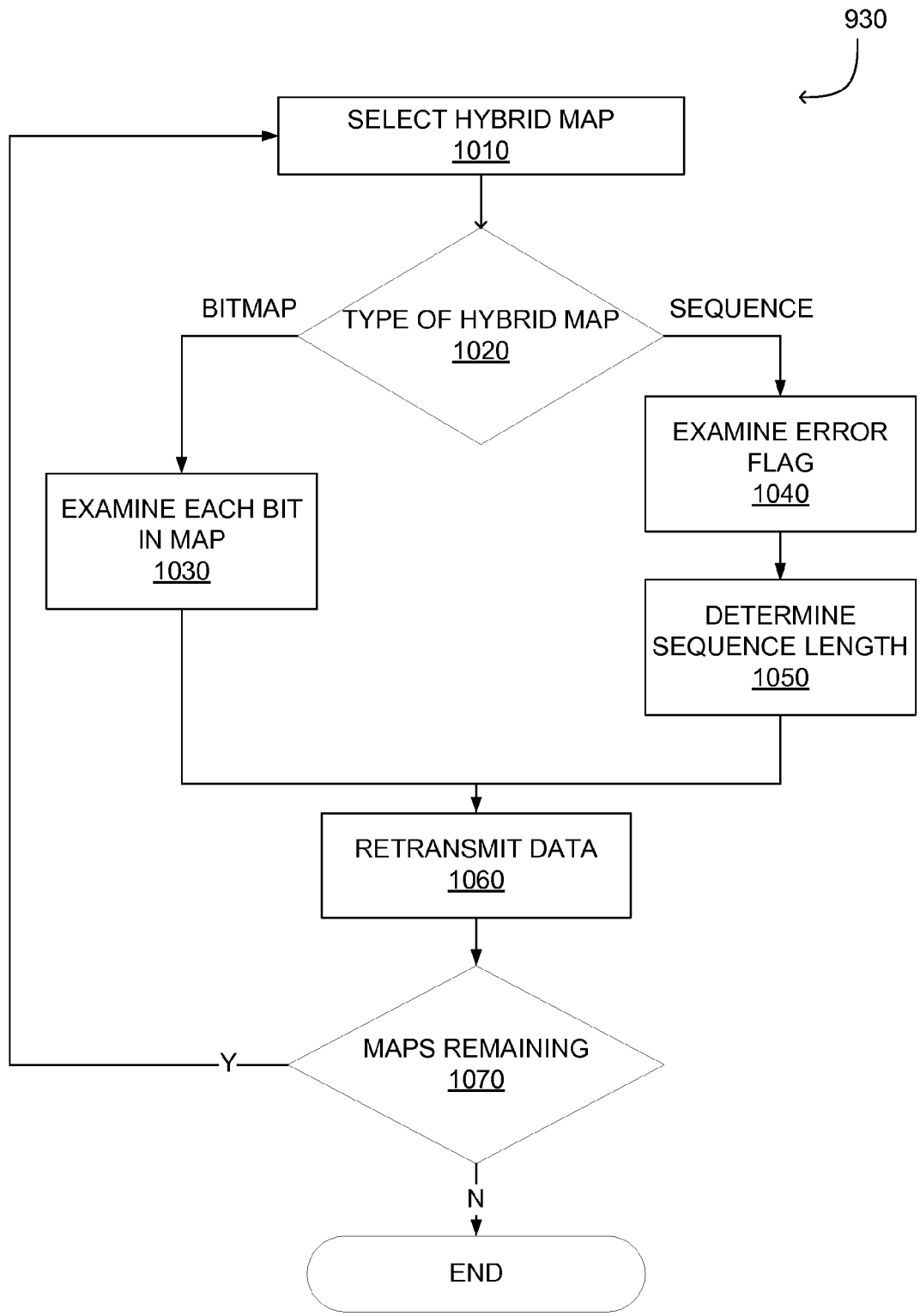
FIG. 10 is a flow chart of a method for decoding information elements having hybrid acknowledgement map(s) according to one embodiment of the invention.

The hybrid ACK maps 407 are then extracted 922 from the payload 220 of the information element 200. The extracted 922 hybrid ACK maps 407 are then decoded 930 to determine if data was lost or corrupted during transmission and to identify any lost or corrupted data for retransmission. In an embodiment, the method described below in FIG. 10 is used to decode 930 the hybrid ACK maps 407. However, the method described below in FIG. 10 is merely an example of a method for decoding 930 hybrid ACK maps 407 and other methods may be used FIG. 10 is a flow chart of a method for decoding 930 information elements 200 containing hybrid acknowledgement maps 407 according to one embodiment of the invention.

Initially, a hybrid ACK map 407 is selected 1010 from the payload 220. Because the payload 220 contains the hybrid quantity field 405 as well as the hybrid ACK maps 407, the selection 1010 is configured to not examine the part of the payload including the hybrid quantity field 405. For example, the selection 1010 begins at a memory location of the payload 220 different than the memory location containing the hybrid quantity field 405.

After selecting 1010 a hybrid ACK map 407, the type of the selected 1010 hybrid ACK map 407 is then determined 1020 by examining the type flag 415 to determine the format of the content block 410. In the example of FIG. 10, the hybrid ACK map 407 can have either a sequence listing type or a bitmap type. However, the bitmap type and sequence listing type are merely examples and the hybrid ACK map 407 can format the content block 410 in any manner capable of describing errors in received data.

In response to determining 1020 the hybrid ACK map 407 is a bitmap-type hybrid ACK map 407a, the content block 410 is examined as a bitmap 420. Thus, each segment of the content block 410 indicates whether the corresponding segment of the received data was correctly or incorrectly received. For example, the bitmap 420 can have a value of "0110010," indicating that three data segments have been correctly received and four data segments have been incorrectly received. The data segments can be identified using data stored in the IE 200 header 210. For example, when the 802.16 standard is used, a sequence number for each data segment can be derived from a starting block number field stored in the header 210.

In response to determining 1020 the hybrid ACK map 407 is a sequence listing-type hybrid ACK map 407b, the content block 410 is examined as including an ACK flag 417 and a sequence length 430. The ACK flag 417 is then examined 1040 to determine whether the sequence was correctly or incorrectly received. The size of the data sequence is then determined 1050 using the value of the sequence length 430. In an embodiment, the sequence length 430 is a binary string representing the number of data segments to be acknowledged. For example, the ACK flag 417 can have a value of "1," indicating correct receipt of the data segments, and the sequence length 430 can have a value of "010010," indicating that 36 data segments have been received; thus, the example combination of ACK flag 417 and sequence length 430 indicates that 36 consecutive data segments have been correctly received.

After appropriately examining the content block 410, data identified as lost or incorrectly received is retransmitted 1060. In an embodiment, the identified data blocks are retransmitted 1060 after each hybrid ACK map 407 is examined. Alternatively, the lost or corrupted data blocks are stored in a queue or other storage structure and are retransmitted 1060 after the current information element 200 is entirely decoded. In yet another embodiment, the lost or corrupted data segments are stored and retransmitted 1060 after a sequence of information elements 200 are decoded 930.

It is then determined 1070 whether hybrid ACK maps 407 remain to be decoded. In an embodiment, the hybrid quantity field 405 is examined to determine the number of hybrid ACK maps 407 in the payload 220. For example, a counter may be initially set to the value identified by the hybrid quantity field 405. The counter is decremented after each hybrid ACK map 407 is selected 1010, and while the counter is non-zero, the next hybrid ACK map 407 is selected 1010. Alternatively, a counter may be initialized to zero and incremented after each hybrid ACK map selection 1010, while the counter does not equal the value described in the hybrid quantity map 405, the next hybrid ACK map 407 is selected 1010. The above-described method is then repeated until there are no hybrid ACK maps 407 remaining to decode 930.

However, FIG. 10 only provides an example decoding 930 scheme for hybrid ACK maps 407, and other decoding schemes can be implemented. For example, a decoding can initially examine the type flag 415 and process the hybrid ACK map 407 accordingly. The above descriptions of decoding 930 methods are merely examples, and the decoding 930 method can be any method capable of determining the number of hybrid ACK maps 407 in an information element 200 and extracting information from the content block 410 of the hybrid ACK map 407.

EXAMPLE APPLICATION

FIG. 11A shows an example of acknowledgment data 1100 to be transmitted using acknowledgement maps. For purposes of illustration only, each acknowledgement data bit 1100 is assumed to indicate whether or not a specific data segment has been correctly received. In the example of FIG. 11A, when an acknowledgement data bit is a "1," the corresponding data segment was correctly received and when an acknowledgement data bit is a "0," the corresponding data segment was lost or incorrectly received. Each data segment can be identified using data contained in the IE 200, such as a starting address field in the header 210.

FIG. 11B, in conjunction with FIG. 11A, illustrates use of conventional information elements 200 and ACK map formats to transmit acknowledgement data 1100. For purposes of illustration, FIG. 11B shows use of the IEEE 802.16 standard to transmit acknowledgement data. The illustrated conventional method uses two ACK map formats, a bitmap format and a sequence listing format. Additionally, the information elements 200 used to transmit the ACK maps are assumed to include headers 210 with a fixed length of 32 bits, as specified in the IEEE 802.16 standard.

Because the acknowledgement data 1100 contains both blocks of correctly received data and alternating segments of correctly and incorrectly received data, different ACK map formats are used to transmit the acknowledgment data 1100. Because the first segment of the acknowledgement data 1100 alternates between correctly received data and incorrectly received, or non-received, data, a bitmap format is initially used for the ACK map. So, the type field 212 of information element 1105 is configured to identify the payload 220 of information element 1105 as bitmap formatted ACK maps. Because ACK maps 1106, 1107, 1108 and 1109 are included in information element 1105, they are bitmap formatted ACK maps. Using conventional methods, the quantity field 214 of information element 1105 limits the number of ACK maps included in information element 1105. For purposes of illustration, the quantity field 214 is assumed to be two bits, resulting in inclusion of at most four ACK maps in each information element 1105, 1110 and 1120. Thus, information element 1105 is only capable of containing four bitmap formatted ACK maps. Once four bitwise ACK maps are included in information element 1105, it is transmitted.

When the acknowledgement data 1100 indicates a block of data has been correctly received or incorrectly received or lost, the ACK map format is changed to a sequence listing to efficiently describe the received data. Thus, the type field 212 of information element 1110 is configured to identify the payload 220 of information element 1110 as sequence listing formatted ACK maps. Thus, ACK maps 1111 and 1112 are formatted as sequence listings. However, when the acknowledgment data 1100 again alternates between correctly and incorrectly received segments, a bitmap format is used to identify the correctly and incorrectly received segments. However, because the type field 212 of information element 1110 identifies the payload 220 as sequence listing formatted ACK maps, a separate information element 1120 must be used to transmit the bitwise formatted ACK maps. Although information element 1110 has the capacity to contain two more ACK maps, the change in ACK map format requires use of an additional information element 1120.

So, information element 1120 has a type field 212 identifying the payload contents as bitmap formatted ACK maps. ACK maps 1121, 1122 are formatted as bitmaps and included in information element 1120. Even though information element 1110 has the capacity to include bitmaps 1111, 1112, 1121, 1122, because information element 1110 cannot include differently formatted bitmaps, information element 1120 is required to transmit the acknowledgment data 1100.

Transmission of multiple information elements 1105, 1110 and 1120 adds overhead to the acknowledgement data transmission by increasing the amount of header 210 data transmitted. For example, transmission of information elements 1105, 1110, 1120 requires transmission of 96 bits of header 210 data in addition to ACK maps 1106, 1107, 1108, 1109, 1111, 1112, 1121 and 1122. Further, the inability of information element 1110 to include differently formatted ACK maps results in additional overhead. Because both information element 1110 and information element 1120 only include two ACK maps, rather than the maximum amount of four ACK maps, half of the capacity of information element 1110 and information element 1120 is wasted. This overhead can reduce the bandwidth available for data transmission, impairing data communication network 100 performance.

FIG. 11C, in conjunction with FIG. 11A, illustrates use of information elements 200 containing hybrid ACK maps 407 to transmit acknowledgment data 1100 according to one embodiment of the present invention. In FIG. 11C, because information element 1130 includes hybrid ACK maps 407, information element 1130 includes a hybrid quantity field 405 indicating the number of hybrid ACK maps 407 in the payload 220. Also, because the hybrid ACK maps 407 comprise a type flag 415 specifying the format of the content block 410, the hybrid ACK map 407 can include data formatted as either a bitmap or a sequence listing. In an embodiment of the present invention, the type field 212 of information element 1130 indicates the payload 220 includes hybrid ACK maps 407. Alternatively, a combination of type field 212 and quantity field 214 indicates information element 1120 includes hybrid ACK maps 407.

Using hybrid ACK maps 407 allows information element 1130 to transmit the complete acknowledgement data 1100. Because each hybrid ACK map 407 is smaller than conventionally formatted ACK maps, each IE 200 includes more hybrid ACK maps 407 to convey the same amount of acknowledgement data as conventional ACK maps. However, by using the hybrid quantity field 405, each IE 200 is capable of including more hybrid ACK maps 407 than conventional ACK maps. In one embodiment, each hybrid ACK map 407 comprises 7 bits, while the conventional ACK map formats comprise 16 bits. Information element 1130 contains 17 hybrid ACK maps 1132-1148 with different formats. One value of the status flag 415 identifies hybrid ACK maps 1132, 1133-1141, and 1144-1148 as bitwise formatted. Similarly, a different value of the status flag 415 indicates hybrid ACK maps 1142 and 1143 use a sequence listing format. Thus, changing the status flag 415 of the hybrid ACK maps 1132-1148 allows information element 1130 to contain the complete acknowledgement data 1100. Assuming information element 1130 has a 32 bit header 210, only 32 bits of header 210 data are needed to transmit the acknowledgement data 1100 using hybrid ACK maps 407. Further, use of hybrid ACK maps 407 maximizes the amount of data included in each information element 200, reducing the overall number of information elements 200 transmitted. Because acknowledgment data 1100 is frequently transmitted in data communication networks 100, this reduction in overhead data can substantially increase the bandwidth available to the data communication network 100 for data transmission.

Additionally, use of hybrid ACK maps 407 simplifies the processing used to encode data for transmission in an IE 200. When hybrid ACK maps 407 are used, seven to eight bit sequences of acknowledgement data 1100 are examined, and the hybrid ACK map 407 type (e.g., bitmap or sequence) is selected based on the error distribution of the seven to eight bit sequence. Conventional ACK map formats do not permit such refined selection of ACK map formats by requiring examination of long strings of acknowledgement data 1100. Thus, the hybrid ACK map 407 allows a greater selectivity in ACK map format selection, increasing the acknowledgement data 1100 described by each IE 200.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

APPENDIX I

Appendix I includes a description of an example structure of an information element for transmission of hybrid ACK maps. The segments listed below illustrate one example of an information element that uses a value in the header to indicate hybrid ACK mps are included in the information element. The sizes of the various components are examples, and have been selected to illustrate that the hybrid ACK maps can be used in data communication networks compliant with the existing IEEE 802.16 standard. As ACK type "0" is not mandatory in WiMAX systems based on the IEEE 802.16 standard, ACK type "0" is configured to identify the hybrid ACK map format . . . . For purposes of illustration, the IEEE 802.16 terms "selective ACK map" is used to describe the "bitmap ACK map" type. The example information element:

| Syntax | Size | Notes |
| --- | --- | --- |
| ARQ_feedback_IE (LAST) { | variable | |
|   CID | 16 bits | The ID of the connection being referenced |
|   LAST | 1 bit | 0 = More ARQ feedback IE in the list |
| | | 1 = Last ARQ feedback IE in the list |
|   ACK Type | 2 bits | 0x0 = Hybrid ACK entry |
| | | 0x1 = Cumulative ACK entry |
| | | 0x2 = Cumulative with Selective ACK entry |
| | | 0x3 = Cumulative ACK with Block Sequence Ack entry |

-continued

| Syntax | Size | Notes |
|---|---|---|
| BSN | 11 bits | |
| Number of ACK Maps | 2 bits | If ACK Type == 01 (or == 0x0), the field is reserved and set to 00. Otherwise the field indicates the number of ACK maps: 0x0 = 1, 0x1 = 2, 0x2 = 3, 0x3 = 4. |
| if (ACK Type == 0x0) { | | |
| Number of Hybrid ACK Maps | 8 bits | |
| for (i=0; i<Number of Hybrid ACK Maps; ++i) { | | |
| Hybrid ACK Subtype | 1 bit | |
| if (Hybrid ACK Subtype == 0) | | |
| Selective ACK Map | 7 bits | |
| else { | | |
| Sequence ACK Map | 1 bit | 0 for NAK, 1 for ACK |
| ACK Flag | | |
| Sequence Length | 6 bits | |
| } | | |
| } | | |
| } | | |
| else { | | |
| if (ACK Type != 01) { | | |
| for (i=0; i< Number of ACK Maps + 1; ++i) { | | |
| if (ACK Type != 3) { | | |
| Selective ACK Map | 16 bits | |
| } | | |
| else { | | Start of Block Sequence ACK Map definition (16 bits) |
| Sequence Format | 1 bit | Number of block sequences associated with descriptor<br>0: 2 block sequences 1: 3 block sequences |
| if (Sequence Format = 0) { | | |
| Sequence ACK Map | 2 bits | |
| Sequence 1 Length | 6 bits | |
| Sequence 2 Length | 6 bits | |
| Reserved | 1 bit | |
| } | | |
| else { | | |
| Sequence ACK Map | 3 bits | |
| Sequence 1 Length | 4 bits | |
| Sequence 2 Length | 4 bits | |
| Sequence 3 Length | 4 bits | |
| } | | |
| } | | End of Block Sequence ACK Map definition |
| } | | |
| } | | |
| } | | |
| } | | |

APPENDIX II

Appendix II includes a description of an alternative structure of an information element for transmission of hybrid ACK maps. The segments listed below illustrate one example of an information element that uses a combination of values in the header to indicate hybrid ACK maps are included in the information element. Thus, the described information element is backward compatible with existing devices compliant with the IEEE 802.16 standard because it does not require a single unique value dedicated to identifying hybrid ACK maps. The sizes of the various components are examples, and have been selected to further illustrate that the hybrid ACK maps can be used in data communication networks compliant with the existing IEEE 802.16 standard. For purposes of illustration, the IEEE 802.16 terms "selective ACK map" is used to describe the "bitmap ACK map" type. The example information element:

| Syntax | Size | Notes |
|---|---|---|
| ARQ_feedback_IE (LAST) { | variable | |
| CID | 16 bits | The ID of the connection being referenced |
| LAST | 1 bit | 0 = More ARQ feedback IE in the list<br>1 = Last ARQ feedback IE in the list |

-continued

| Syntax | Size | Notes |
|---|---|---|
| ACK Type | 2 bits | 0x0 = Selective ACK entry<br>0x1 = Cumulative ACK entry<br>0x2 = Cumulative with Selective ACK entry<br>0x3 = Cumulative ACK with Block Sequence Ack entry |
| BSN | 11 bits | |
| Number of ACK Maps | 2 bits | If ACK Type == 01, and the number of ACK maps == 00, then ACK Type is Cumulative ACK.<br>If ACK Type == 01, and the number of ACK maps == 01, then ACK Type is Hybrid ACK.<br>Otherwise the field indicates the number of ACK maps:<br>0x0 = 1, 0x1 = 2, 0x2 = 3, 0x3 = 4. |
| if ((ACK Type == 01) && ( number of<br>   ACK maps == 01 )) { | | |
|   Number of Hybrid ACK Maps | 8 bits | |
|   for (i=0; i<Number of Hybrid ACK<br>    Maps; ++i) { | | |
|     Hybrid ACK Subtype | 1 bit | |
|     if (Hybrid ACK Subtype == 0) | | |
|       Selective ACK Map | 7 bits | |
|     else { | | |
|       Sequence ACK Map ACK Flag | 1 bit | 0 for NAK, 1 for ACK |
|       Sequence Length | 6 bits | |
|     } | | |
|   } | | |
| } | | |
| else { | | |
|   if (ACK Type != 01) { | | |
|     for (i=0; i< Number of<br>      ACK Maps + 1; ++i) { | | |
|       if (ACK Type != 3) { | | |
|         Selective ACK Map | 16 bits | |
|       } | | |
|       else { | | Start of Block Sequence ACK Map definition (16 bits) |
|         Sequence Format | 1 bit | Number of block sequences associated with descriptor<br>0: 2 block sequences 1: 3 block sequences |
|         if (Sequence Format = 0) { | | |
|           Sequence ACK Map | 2 bits | |
|           Sequence 1 Length | 6 bits | |
|           Sequence 2 Length | 6 bits | |
|           Reserved | 1 bit | |
|         } | | |
|         else { | | |
|           Sequence ACK Map | 3 bits | |
|           Sequence 1 Length | 4 bits | |
|           Sequence 2 Length | 4 bits | |
|           Sequence 3 Length | 4 bits | |
|         } | | |
|       } | | End of Block Sequence ACK Map definition |
|     } | | |
|   } | | |
| } | | |

What is claimed is:

1. A method for processing an information element having a header and a payload, comprising:
    receiving the information element;
    determining whether the information element includes a hybrid acknowledgement map by comparing a value in the header of the information to a defined value, the defined value indicating that the information element includes a hybrid acknowledgement map;
    responsive to the information element including a hybrid acknowledgment map,
    extracting the hybrid acknowledgment map; and
    decoding the hybrid acknowledgment map.

2. The method of claim 1, wherein the hybrid acknowledgement map comprises a type flag and a content block.

3. A method for processing an information element having a header and a payload, comprising:
    receiving the information element;
    determining whether the information element includes a hybrid acknowledgement map;
    responsive to the information element including a hybrid acknowledgment map, extracting the hybrid acknowledgment map;
    selecting the hybrid acknowledgment map;
    determining a type of the hybrid acknowledgement map;
    examining a content of the hybrid acknowledgement map based on the determined type; and
    retransmitting data identified by the hybrid acknowledgement map as incorrectly received.

4. The method of claim 3, further comprising:
    determining whether the payload includes additional hybrid acknowledgement maps;
    selecting a second hybrid acknowledgement map;
    determining a type of the second hybrid acknowledgement map;
    examining a content of the second hybrid acknowledgement map based on the determined type; and
    retransmitting data identified by the second hybrid acknowledgement map as incorrectly received.

5. The method of claim 4, wherein determining whether the payload includes additional hybrid acknowledgement maps comprises comparing a count of hybrid acknowledgment maps selected to a hybrid quantity field included in the payload.

6. The method of claim 3, wherein determining a type of the hybrid acknowledgment map comprises:
    extracting a value from a type flag, the type flag included in the hybrid acknowledgment map;
    comparing the extracted value to determined values, the determined values describing different types; and
    assigning the type to the hybrid acknowledgement map using the comparison.

7. A method for transmitting an information element including a hybrid acknowledgment map and a hybrid quantity field, the hybrid acknowledgement map comprising a type flag and a content block, comprising:
    receiving a data;
    examining the received data for errors;
    creating a hybrid acknowledgment map header;
    determining the frequency of errors in the received data;
    determining a content format of the hybrid acknowledgment map;
    initializing a type flag of the hybrid acknowledgement map, the type field identifying the content format of the hybrid acknowledgement map;
    storing a content to a content block of the hybrid acknowledgment map, the content identifying the correct received data or the errors in the received data;
    incrementing the hybrid quantity field; and
    transmitting the generated information element.

8. The method of claim 7, wherein the type flag comprises a sequence of bits.

9. The method of claim 7, wherein the content block comprises at least one of a bitmap or a sequence listing.

10. The method of claim 7, wherein generating the information element including the hybrid acknowledgment map and the hybrid quantity field assigning a value to a field in the header of the information element.

11. A computer program product for processing an information element having a header and a payload the computer program product comprising a computer-readable medium containing computer program code for performing the method comprising:
    receiving the information element;
    comparing a value in the header of the information to a defined value, the defined value indicating that the information element includes a hybrid acknowledgement map;
    responsive to the information element including a hybrid acknowledgment map:
        extracting the hybrid acknowledgment map; and
        decoding the hybrid acknowledgment map.

12. The computer program product of claim 11, wherein the hybrid acknowledgement map comprises a type flag and a content block.

13. A computer program product for processing an information element having a header and a payload the computer program product comprising a computer-readable medium containing computer program code for performing the method comprising:
    receiving the information element;
    determining whether the information element includes a hybrid acknowledgement map;
    responsive to the information element including a hybrid acknowledgment map:
    extracting the hybrid acknowledgment map;
    selecting the hybrid acknowledgment map;
    determining a type of the hybrid acknowledgement map;
    examining a content of the hybrid acknowledgement map based on the determined type; and
    retransmitting data identified by the hybrid acknowledgement map as incorrectly received.

14. The computer program product of claim 13, further comprising:
    determining whether the payload includes additional hybrid acknowledgement maps;
    selecting a second hybrid acknowledgement map;
    determining a type of the second hybrid acknowledgement map;
    examining a content of the second hybrid acknowledgement map based on the determined type; and
    retransmitting data identified by the second hybrid acknowledgement map as incorrectly received.

15. The computer program product of claim 14, wherein determining whether the payload includes additional hybrid acknowledgement maps comprises comparing a count of hybrid acknowledgment maps selected to a hybrid quantity field included in the payload.

16. The computer program product of claim 13, wherein determining a type of the hybrid acknowledgment map comprises:

extracting a value from a type flag, the type flag included in the hybrid acknowledgment map;

comparing the extracted value to determined values, the determined values describing different types; and assigning the type to the hybrid acknowledgement map using the comparison.

17. An apparatus for transmitting an information element including a hybrid acknowledgement map and a hybrid quantity field, the apparatus comprising:

a transceiver for receiving a data and for transmitting the information element;

an error control module, coupled to the transceiver, the error control module determining whether the received data contains errors and determining a frequency of errors in the received data; and an encoder module, coupled to the error control module generating the information element including the hybrid acknowledgment map and the hybrid quantity field, creating a hybrid acknowledgment map header, determining a content format of the hybrid acknowledgment map, initializing a type flag of the hybrid acknowledgement map, the type field identifying the content format of the hybrid acknowledgement map, storing a content to a content block of the hybrid acknowledgment map, the content identifying the correct received data or the errors in the received data and incrementing the hybrid quantity field, wherein the hybrid acknowledgement map identifies correct received data or data with errors, the information element transmitted using the transceiver.

18. The apparatus of claim 17, wherein the error control module comprises a processor.

19. The apparatus of claim 17, wherein the encoder module comprises a processor.

20. An apparatus for processing an information element including a hybrid acknowledgement map and a hybrid quantity field, the apparatus comprising:

a transceiver for receiving an information element including a hybrid acknowledgement map and a hybrid quantity field and for transmitting a data, wherein the hybrid acknowledgement map comprises a content block and a type flag;

a decoder module, coupled to the transceiver, the decoder module using the hybrid quantity field to determine a number of hybrid acknowledgement maps included in the information element, using the type flag of the hybrid acknowledgment map to determine the format of the content block of the hybrid acknowledgement map and using the content block of the hybrid acknowledgement map to determine the data to transmit; and a data store, with coupled to the decoder module, accessing the data to transmit in response to the decoder module determination using the content block of the hybrid acknowledgement map.

21. The apparatus of claim 20, wherein the error control module comprises a processor.

22. The apparatus of claim 20, wherein the encoder module comprises a processor.

* * * * *

UNITED STATES PATENT AND TRADEMARK OFFICE
CERTIFICATE OF CORRECTION

| | | |
|---|---|---|
| PATENT NO. | : 7,720,070 B1 | Page 1 of 1 |
| APPLICATION NO. | : 11/675350 | |
| DATED | : May 18, 2010 | |
| INVENTOR(S) | : Yalun Li | |

It is certified that error appears in the above-identified patent and that said Letters Patent is hereby corrected as shown below:

Column 24, Claim 20, line 23, delete "with".

Signed and Sealed this

Twenty-sixth Day of October, 2010

David J. Kappos
*Director of the United States Patent and Trademark Office*